United States Patent [19]

Kleysteuber et al.

[11] 4,024,949
[45] May 24, 1977

[54] TRAVERSE BENDABLE ENDLESS BELT CONVEYOR

[75] Inventors: William K. Kleysteuber, Wexford; William J. Peterson, Jr., Coraopolis, both of Pa.

[73] Assignee: The United States of America as represented by the Secretary of the Interior, Washington, D.C.

[22] Filed: Aug. 11, 1975

[21] Appl. No.: 603,422

[52] U.S. Cl. .............................. 198/818; 198/831; 198/860
[51] Int. Cl.² ....................................... B65G 15/00
[58] Field of Search .......... 198/109, 182, 191, 201, 198/DIG. 2, 192 A, 196, 818, 860, 831

[56] References Cited

UNITED STATES PATENTS

| 1,530,707 | 3/1925 | Warner | 198/196 X |
| 2,260,587 | 10/1941 | Shields | 198/109 |
| 2,836,283 | 5/1958 | Horth | 198/109 |
| 3,701,411 | 10/1972 | McGinnis | 198/109 |

Primary Examiner—Evon C. Blunk
Assistant Examiner—Douglas D. Watts
Attorney, Agent, or Firm—Thomas Zack; Gersten Sadowsky

[57] ABSTRACT

An endless conveyor apparatus is capable of transverse bending to negotiate a curve lying substantially in a horizontal plane. Pretensioned elongated elastic beads attached to the edges of a flexible endless conveyor belt accomplishes this by accommodating the difference in travel required by the bend radius differential. Specifically, the elastic beads are pretensioned sufficiently to assure support of the belt edges and resist catenary sag adjacent the inside transverse bend radius. Rollers on the frame of the apparatus engage the elastic beads supporting and driving the belt. A spine may be provided along the longitudinal center line of the conveyor and may be engaged by a plurality of pairs of guide wheels. The elastic beads are shorter than the load portion of the belt to provide for the pretensioning function. Laterally extending corrugations assist in accommodating the transverse bending action and flexible cross lines extend along the corrugations supported from the elastic beads.

7 Claims, 5 Drawing Figures

TRAVERSE BENDABLE ENDLESS BELT CONVEYOR

The present invention relates to conveyors, and more particularly, to endless conveyors that are capable of transverse bending so as to negotiate a horizontal curve.

BACKGROUND OF THE INVENTION

In conveying of bulk material, it is sometimes necessary to negotiate a curve, such as a curve in a mine passage. Generally speaking, flat conveyor belts cannot negotiate a transverse curve because the two edges cannot accommodate the difference in length between the inside bend radius and the outside bend radius. Essentially what happens is that the inside edge collapses because the edge tension is not maintained due to the shortened radius. The load on the belting is spilled over this inside edge. The outer edge of the belt will tend to roll up over the conveyor belt pushing the material on the belt toward the inside edge thereby compounding the problem.

Previously, there have been attempts at making conveying systems with conveyor belts capable of passing around curves. In one prior art system, a chain-driven, multiple pan conveyor has rigid sides shaped to prevent side spillage of material and an underlying continuous belt that prevents the material from dropping through the clearances between the articulated pans. The fabricating costs of the pans and the underlying belt makes the system relatively expensive. The pans limit the conveying capacity for a given belt width and height. And, the interacting metal pans and the chain drive of the system generate excessive noise creating an unfavorable working condition.

Another approach that has been taken to the problem is to provide a belt having outer edges of reduced thickness with guide rollers engaging the edges to hold the edge along the outer transverse bend down and to partially collapse the inner edge as it goes around the inside transverse bend. This type of belt is subject to substantial wear, particularly along the edges that are inherently weak due to the reduced thickness. Also, the edges of the belt are subjected to substantial crushing pressure by the guide rollers, creating the tendency to cause premature wearing and fraying of the belt edges. This inevitably leads to the belt jumping out from between the rollers under periodic heavy loading conidtions, causing spillage and costly down time. Eventually the belt must be replaced. Also, because the edges of the belt are thin, an unusually large number of support rollers are required under the belt making the conveyor system very costly.

OBJECTIVES OF THE INVENTION

Thus, it is one object of the present invention to provide an endless conveyor system that is capable of accommodating a curve while avoiding the difficulties of the prior attempts.

It is another object of the present invention to provide a conveyor apparatus and an endless conveyor belt used on the apparatus wherein special elastic edge beads are subjected to the required stretch to accommodate the turning action.

It is another object to provide a conveyor apparatus and a belt that prevents spilling of the load from the edges and is relatively inexpensive to manufacture.

It is still another object of the present invention to provide an endless conveyor belt and combination conveyor apparatus wherein tracking and driving of the belt are carried out in a novel manner along multiple intermediate points.

BRIEF DESCRIPTION OF THE INVENTION

An endless conveyor apparatus is provided wherein pretensioned elastic beads attached to the load-carrying portion of the conveyor belt allow the belt to bend transversely so as to accommodate a curve. The pretension in the elastic bead extending adjacent the inside transverse bend radius is the key to effectively resisting catenary sag to prevent the spilling of the load when the conveyor belt travels around the curve. The pretensioning of the beads travelling in the guide rollers is sufficient so that for the given maximum curve of the conveyor belt there is still sufficient tension on the inside bead to hold up the edge of the load portion. Along the outside transverse bend radius of the conveyor belt, the elasticity of the bead is sufficient to allow the bead to stretch further to a maximum tension thereby accommodating the greater radius without bending over.

The apparatus includes multiple inverted A-frame means that supports the multiple guide rollers at intermediate positions along and adjacent the edges of the belt. The individual frame members are adjustably spaced from each other by suitable means, that may include motor operated jack screw devices. To set a section of the conveyor system in the curve mode, the upper and lower jack screw devices on the outside of a bend are extended, whereas the upper and lower jack screws along the inside bend radius are operated toward retraction.

The conveyor is advantageously driven by a more positive arrangement through pairs of opposed guide rollers that engage the elastic beads. This is done by simply driving at least one of the rollers of each pair preferably only along the upper run of the belt. Each section of the belt is thus more uniformly moved with increased friction engagement between the rollers and the beads to virtually eliminate the possibilty of stalling under heavy loading. The guide rollers are characterized by grooved drive surfaces so as to mate and engage opposite sides of the bead.

A center spine is provided to reinforce the conveyor and shape to load holding form. The spine is engaged by a plurality of guide wheels to provide further stability to the conveyor during operation. The conveyor load portion may include corrugations extending laterally outward from the area of the center spine to provide extra lateral flexibility. Cross lines extend along the corrugations and through the center spine to add support to the load portion of the conveyor. The free ends of the lines are attached to the two elastic beads running along the edge. The lengths of the lines between the load portion and the beads as well as the elasticity of the beads themselves provide ideal shock absorbing action. This contributes to quiet operation and allows the frame to be designed without excessive reinforcement. The lines may be flexible metal of high tensile strength with an integral upset portion on each end to hold the strand to the respective beads.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restricitve.

DETAILED DESCRIPTION OF THE PREFERRED EMBODIMENT

A conveyor belt 10 constructed in accordance with the principles of the present invention includes a central load-carrying portion 11 extending in the endless fashion shown with upper and lower runs. It will be understood that the load, that might be a bulk material, such as coal, is loaded at the left-hand end of FIG. 1 and is transported along the upper run of the belt in the direction of the arrow to a discharge point adjacent the right-hand end shown in FIG. 1.

The side of the conveyor belt comprises endless elastic beads 12, 13 serving to support the load portion 11 through a plurality of cross lines 14. These elastic beads are advantageously guided at a plurality of intermediate points along both runs by a plurality of pairs of rollers 15, 16.

Figure 1:
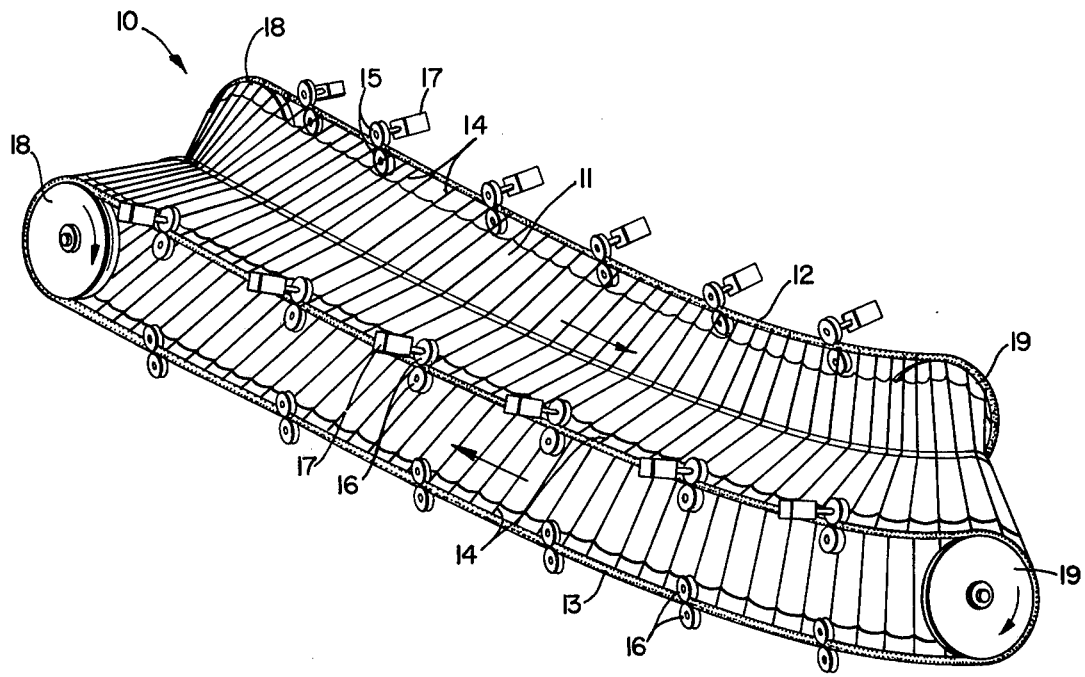
FIG. 1 is an overall conceptual showing of a conveyor belt in combination with side driving and tension holding pulleys set up in accordance with the principles of the present invention.

One of each of the pairs at least along the upper run is driven by a suitable electric motor 17 in order to more uniformly drive the conveyor 10. The pairs of rollers 15, 16 provided along the lower run of the belt 10 are preferably idlers, as shown in FIG. 1. At the input end is a pair of head pulley discs engaging the beads 12, 13 to reverse the travel of the endless belt 10. Similar discs 19 are provided at the discharge or tail end.

The elastic beads 12, 13 in supporting the conveyor belt 10 do so with several desirable advantages. First, the only support required is through the edge rollers 15, 16 and the discs 18, 19, thus obviating expensive underlying roller support as required on other conveyors. The edges of the load portion 11 are not crushed and weakened by roller engagement as before. The flexing of the beads 12, 13 and lines 14 provide shock absorbing action and compensating action to allow different lateral portions to momentarily run at different speeds without straining the supporting frame.

Figures 3, 4:
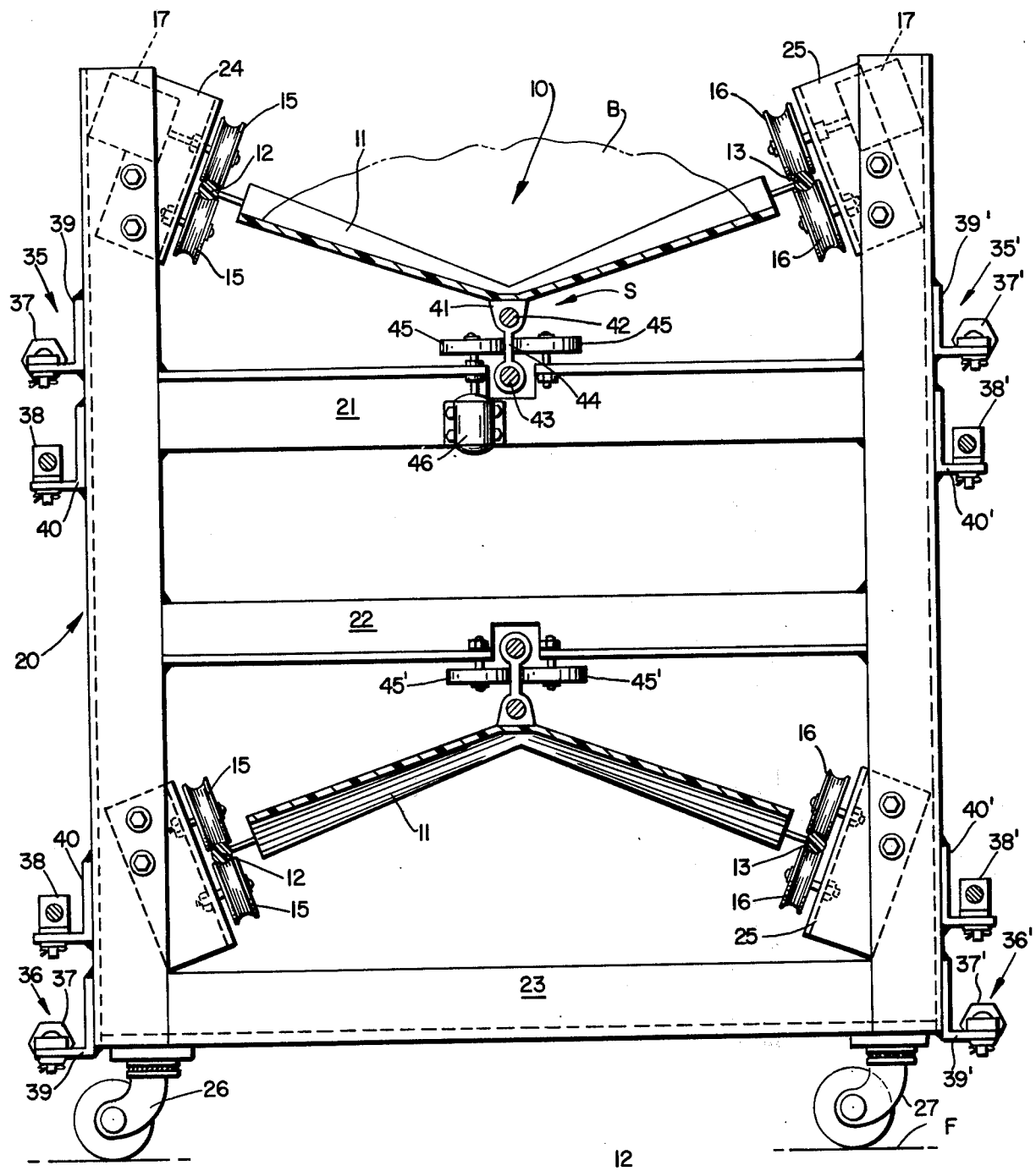
FIG. 3 is an enlarged cross-sectional view taken along line 3—3 of FIG. 2 and showing the structural frame and support means of the novel conveyor.
FIG. 4 is a detailed partial view showing the conveyor structure in cross-section and the attachment of the elastic bead.

Each of the rollers 15, 16 is grooved to receive the beads 12, 13 between the opposed faces (see FIG. 3). The load portion 11 is thus held tensioned in the longitudinal as well as the lateral direction by the powered pulling force of the rollers 15, 16 in conjunction with the head and tail pulley discs 18, 19. The driving action is more efficient since it is spread at several intermediate points along the upper or load-carrying run of the belt.

Figure 2:
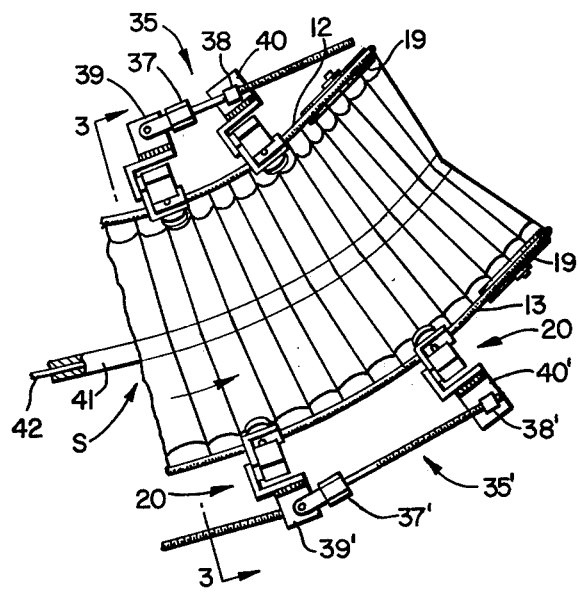
FIG. 2 is a top view of the conveyor apparatus including the frame and the curve adjusting means.

The conveyor belt 11 is formed with a plurality of corrugations extending laterally outward from a center spine S (see FIGS. 1–3). These corrugations assist in allowing the load portion 11 to bend in the transverse direction to accommodate a curve lying substantially in a horizontal plane, as best shown in FIG. 2. The scalloped edges of the load portion 11 between lines 14 along the inside bend radius are shortened; whereas, along the outside bend radius they are stretched toward full extension (see FIGS. 1 and 2).

As a key element in fabricating the belt 10, the lines 14 are positioned perpendicularly through the beads 12, 13 (see FIG. 4) close together when the beads are unstretched or in repose. In other words, the unstreteched elastic beads 12, 13 are shorter than the adjacent edges of the load portion so that when passing around the inside transverse bend radius (bead 12 in FIGS. 1 and 2) sufficient tension remains to support the load. The tensioned beads maintain the load retaining cross-section by not only so supporting the inside radius but by also through further tensioning preventing the outside edge 13 from rolling over.

The conveyor apparatus of the present invention may be provided with a suitable frame means that may include fabricated inverted A-frame members or sections, generally designated by the reference numeral 20 (see FIG. 3). Middle cross pieces 21, 22 and bottom cross member 23 provide a rigid framework wherein conveyor belt 10 may be stretched to support bulk material B in a V-shaped cross section. Brackets 24, 25 support the rollers 15, 16 that hold the respective beads 12, 13. The drive motors 17 along the upper run are positioned within the bracket and framework 20, as shown. Suitable support casters 26, 27, or other support feet, such as skids, are provided along the bottom cross member 23 for support of the structure on the floor F of a mining passage, for example.

As best shown in FIG. 4, the conveyor belt 10 with the transverse corrugations is reinforced, as well as supported, by the plurality of flexible, high tensile strength cross lines or wires 14 that are embedded within the conveyor belt structure. The free end of the wires, which may be single strand steel (FIG. 4), may be attached to the elastic beads by providing an upset head 31 or similar structure.

Along the sides of the upstanding frames 20 are provided matched pairs of jack screw devices 35, 35' and 36, 36' for maintaining the proper side-to-side spacing, that in turn determines the curve of the belt in the horizontal plane. When the conveyor is used in the straight run mode, the jack screw devices would be adjusted approximately at the middle of their travel. When it is desired to put a curve into the conveyor, the jack screw devices 35, 36 on one side are adjusted in or shortened; whereas, the jack screw devices 35', 36' on the opposite side are extended all the way out or lengthened. A showing of this appears in FIG. 2 wherein the left-hand side is in substantially the full "in" position and the opposite side jack screw device 35' is in substantially the full "out" position. In this adjusted position of FIG. 2, the conveyor is provided with transverse bending so as to negotiate or accommodate a curve to the left (see FIG. 2).

Although other driving means may be used, the jack screw devices shown herein to illustrate the principles of the invention, include suitable drive motors 37, 37' pivotally mounted on angles 39, 39' welded or otherwise attached to the sides of upright frame members 20. The driving screws of the jack screw devices extend through pivotal nuts 38, 38' mounted on additional angles 40, 40' also shown in FIG. 3 are associated with the next in-line jack screw devices used for adjusting member 20 and the immediate next upstream section. As shown, the longitudinally adjacent devices are offset to avoid interference.

The conveyor belt 11 may include a longitudinally extending spine S which includes a molded backbone member 41 and reinforcing over and under cables 42, 43. A narrow connector 44 provides opposite flat guiding and driving surfaces for a plurality of guide wheels 45. At least one of the pairs of the wheels 45 may be driven by additional drive motor 46. The drive motors 46, of course, may be an alternative rather than an additive drive means to the plurality of motors 17, as desired. The lower run guide wheels 45' are preferably idlers. The driving of the belt 10 along a plurality of intermediary points has been found to be most helpful in assuring against stalling. The driving force is not concentrated in one position so that greater driving frictional area is realized. This provides greater reliability in tracking of the belt and almost no chance of deleterious slipping or skewing of the belt is present.

Figure 5:
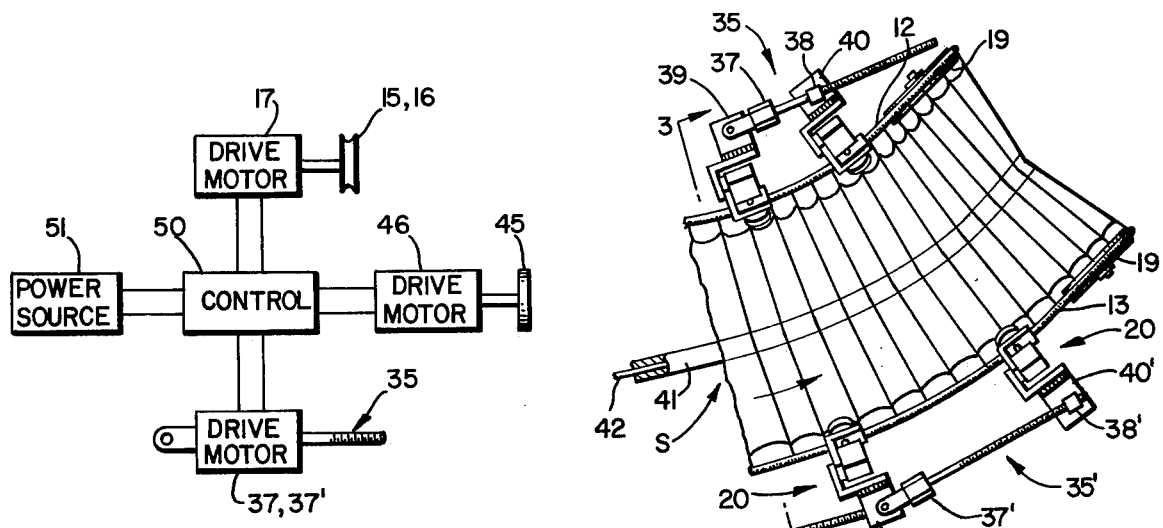
FIG. 5 is a schematic diagram showing an arrangement of drive motors with central control.

As best shown in FIG. 5, the three types of drive motors 17, 37 and 46 are preferably driven through a central control 50 provided with a suitable power source 51.

In operation, when adjusted the spacing of the frames 20 (see FIG. 2), and thus the curving of the conveyor system, it should be remembered the motors 36, 37 on one side are operated as a pair, and the rollers 36', 37' on one side are operated as a pair (see FIG. 3). Now operating these pairs of motors 36, 37 and 36', 37' in this way, the conveyor belt between adjacent section 20 can be readily set up for negotiating a curve of any degree between straight and the maximum, such as about 30° per section, as shown in FIG. 1. If desired and as mentioned above, other specific means may be employed to properly adjust the frames 20 to gain just the right amount of turning angle desired. For example, manual driving means in lieu of motors 37, 37' may be provided, or mechanical adjusting linkage other than jack screw devices may be used, as are well within the skill of the art involved.

An important facet of the structure of belt 10 per se, should be reemphasized. That is, the lines 14 are longitudinally spaced along the elastic beads 12, 13 so that when the belt 10 is positioned on the support structure of the system, including the head discs and the tail discs 18, 19, respectively, and the drive and idler rollers 15, 16, the beads are pretensioned. This means that in the hypothetical set-up where the conveyor is being used for straight ahead conveying, a predetermined medium tension is provided. Thus, when a curve is made, such as shown in FIG. 1 (a left-hand curve) and the scalloped edges of the corrugations between the cross lines 30 are allowed to sag due to the decrease in the length of the path having to be traveled, support is maintained by the head 12 since it has by design not shortened to the point where all tension is released. Consequently, the arrangement of the invention successfully prevents spilling of the load off this left edge. The lower residual tension in the bead 12 is thus selected to be that threshold value just above where there would be uncontrollable sag and thus the dumping of the product as described. On the other hand, the elasticity of the beads 12, 13 is selected to be sufficient so that the opposite side bead (bead 13 in FIG. 2) can stretch to the upper threshold value and keep the edge of the load portion 11 from rolling over toward the center line.

Note again in FIG. 1, that the curvature of the scalloped edges between the cross lines 14 on the inner transverse bend radius is substantially greater than the curvature on the outer transverse bend radius. In this way, the corrugations of the load portion 11 help in negotiating the curve. But, because of the positive tension in both beads 12, 13 the load of bulk material B is held secure in a cross-section that remains substantially constant thereby preventing possible spillage.

In this disclosure, there is shown and described only the preferred embodiment of the invention, but as aforementioned, it is to be understood that the invention is capable of use in various other combinations and environment and is capable of changes or modifications within the scope of the inventive concept as expressed herein.

What is claimed is:

1. An endless conveyor apparatus capable of transverse bending to accommodate a curve lying substantially in the horizontal plane comprising:
    an endless conveyor belt capable of transverse bending,
    first and second elongated elastic means flexibly attached to and extending along respective edges of said belt,
    frame means,
    means to guide and hold said elastic means under tension, said guiding and holding means comprising a plurality of pairs of opposed guide rollers engaging said first and second elastic means at intermediate points along the length of said conveyor belt;
    drive means for said belt, and
    means on said frame means to adjust said guide means to transversely bend said belt around the curve,
    said first and second elastic means being pretensioned sufficiently to support the respective belt edge to resist catenary sag adjacent the inside transverse bend radius to prevent spilling of the load when the conveyor belt travels around the curve.

2. The endless conveyor apparatus of claim 1 wherein said elastic means comprises first and second endless beads, the opposed surfaces of the rollers engaging opposite sides of said bead.

3. The endless conveyor apparatus of claim 2 wherein said rollers have a peripheral groove mating with said bead.

4. The endless conveyor apparatus of claim 1 wherein said drive means comprises a drive motor for at least one of said rollers of each roller pair at least along the upper run of the conveyor belt.

5. An endless conveyor belt adapted to travel around a curve lying substantially in a horizontal plane comprising:
    a flexible load portion capable of transverse bending including a plurality of laterally extending corrugations to accommodate the bending action;
    first and second elongated elastic means flexibly attached to and extending along respective edges of said load portion, said first and second elastic means being shorter in length when unstretched than the edges of said load portion; and a plurality of cross lines extending along said corrugations to act as said flexible attachment to support said load portion, the free ends of said lines being respectively attached to said first and second elastic means;

whereby when said load portion is longitudinally extended for supporting a load the elastic means is assured of being tensioned and remaining tensioned sufficiently to support the respective load portion edge to resist catenary sag adjacent the inside transverse bend radius to prevent spilling of the load when the conveyor belt travels around the curve.

6. The conveyor belt of claim 5 wherein said elastic means comprises first and second endless beads, said free ends of said lines extending perpendicularly through said beads.

7. The conveyor belt of claim 6 wherein said lines are of flexible high tensile strength metal, and an integral upset portion on each end to hold the line in the respective bead.

* * * * *